No. 734,283. PATENTED JULY 21, 1903.
D. M. PFAUTZ.
MOTOR VEHICLE.
APPLICATION FILED JAN. 2, 1903.
NO MODEL. 3 SHEETS—SHEET 1.
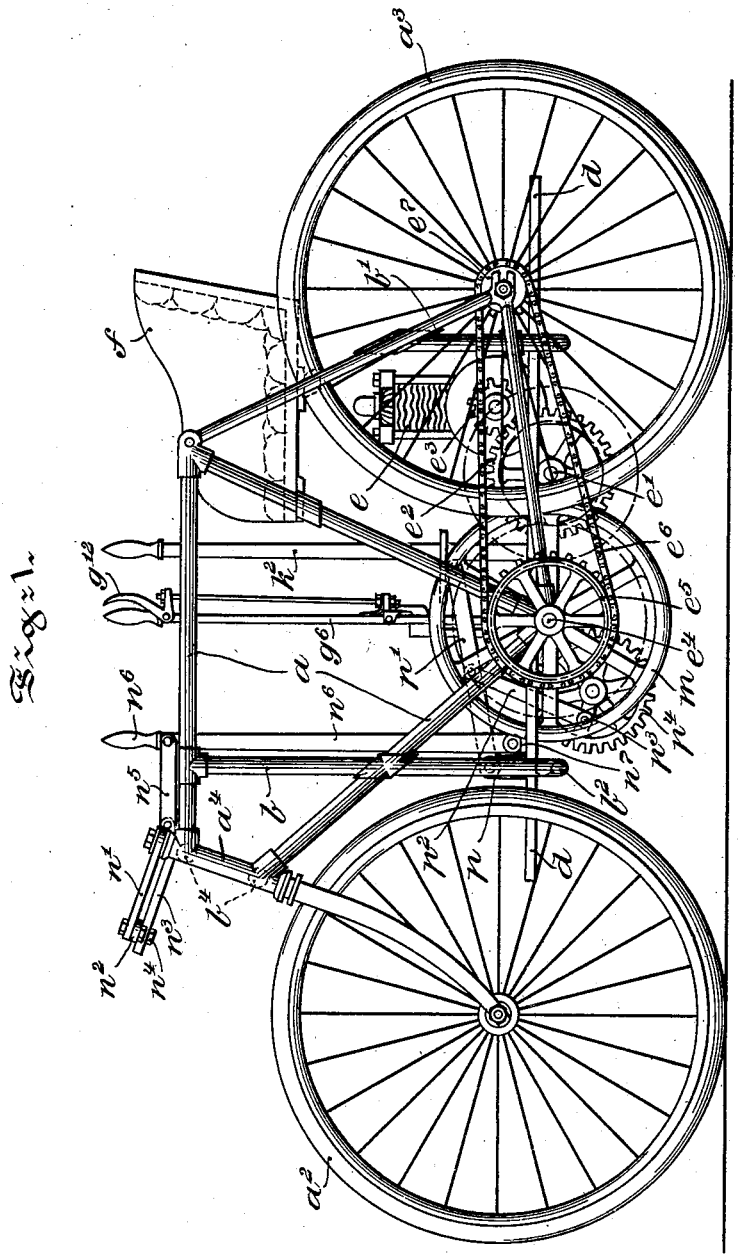

No. 734,283. PATENTED JULY 21, 1903.
D. M. PFAUTZ.
MOTOR VEHICLE.
APPLICATION FILED JAN. 2, 1903.
NO MODEL. 3 SHEETS—SHEET 2.
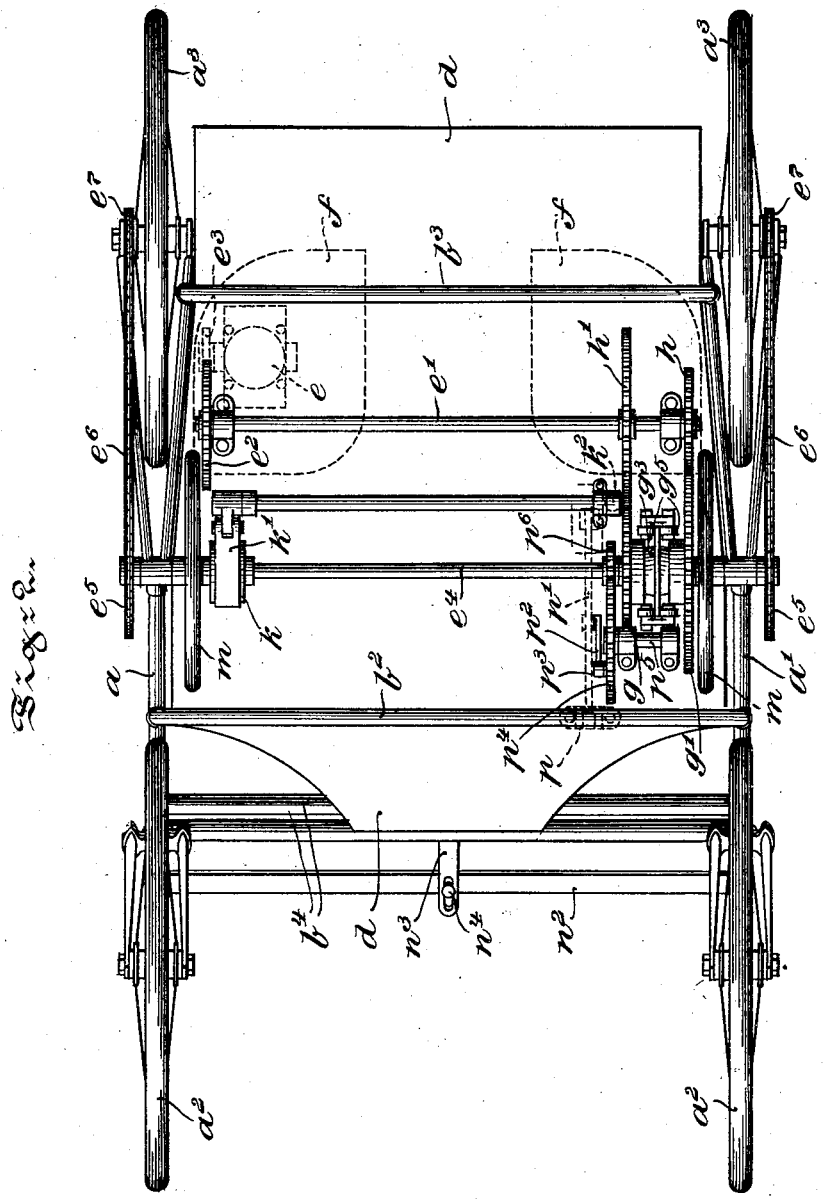

No. 734,283. PATENTED JULY 21, 1903.
D. M. PFAUTZ.
MOTOR VEHICLE.
APPLICATION FILED JAN. 2, 1903.
NO MODEL. 3 SHEETS—SHEET 3.
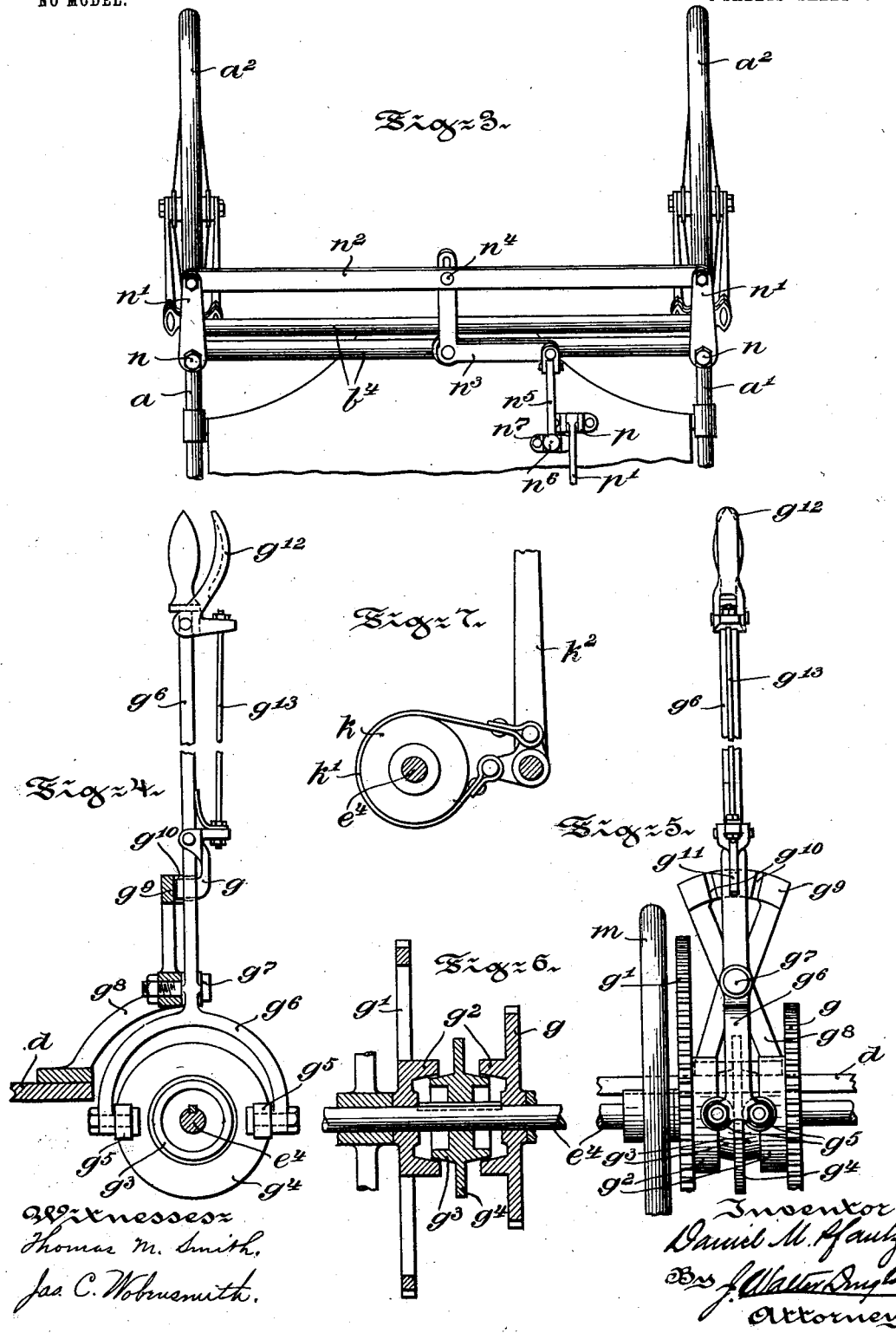

No. 734,283. Patented July 21, 1903.

UNITED STATES PATENT OFFICE.

DANIEL M. PFAUTZ, OF GERMANTOWN, PENNSYLVANIA.

MOTOR-VEHICLE.

SPECIFICATION forming part of Letters Patent No. 734,283, dated July 21, 1903.

Application filed January 2, 1903. Serial No. 137,401. (No model.)

*To all whom it may concern:*

Be it known that I, DANIEL M. PFAUTZ, a citizen of the United States, residing at Germantown, in the county of Philadelphia and State of Pennsylvania, have invented certain new and useful Improvements in Motor-Vehicles, of which the following is a specification.

My invention has relation to a motor-vehicle of that type or class wherein two bicycles are coupled together and furnished with a motor to form a four-wheeled motor-vehicle, and in such connection it relates to the construction and arrangement of such a motor-vehicle.

The principal object of my invention is to form from two ordinary bicycles by a simple and strong connecting structure a motor-vehicle wherein seats for the occupants are disposed side by side above a platform forming a floor for the vehicle and to provide the vehicle thus formed with a motor and mechanism for transmitting the power of the motor to the driving-wheels of the connected bicycles.

To this end my invention consists, first, in securing to the frame of each bicycle two verticle tubes or uprights and connecting these two sets of tubes by cross-tubing forming a light but strong connection between the bicycles and in supporting on this connection the motor and driving mechanism, as well as a platform forming the floor of the vehicle; second, to support above the floor of the vehicle thus formed two seats separated from each other by an aisle and accessible from the rear of the vehicle by passing onto and upon said floor; third, to provide in such a vehicle a shaft connecting the sprocket-wheels of the bicycles together and geared to a second shaft in gear with the motor, both shafts being supported beneath the floor of the vehicle; fourth, to provide in conjunction with the shaft connecting the sprockets of the bicycles together two momentum or fly wheels, each secured to an end of the shaft adjacent to but inside of a sprocket-wheel, whereby the motion of the shaft is steadied; fifth, to provide in addition to the motor, the motor-shaft, and the sprocket-shaft a treadle mechanism adapted to rotate the sprocket-shaft independently of the motion conveyed to said shaft by the motor-shaft, and, sixth, to provide a steering mechanism of simple construction whereby both front or steering wheels of the connected bicycles may together be turned to the right or left by a positive movement of a steering lever or wheel.

The nature and scope of my invention will be more fully understood from the following description, taken in connection with the accompanying drawings, forming part hereof, in which—

Figure 1 is a side elevational view of a motor-vehicle embodying main features of my invention. Fig. 2 is an underneath plan view of the same. Fig. 3 is a top or plan view illustrating in detail the steering mechanism for the vehicle. Fig. 4 is a front elevational and detail view of the clutch for throwing the driving mechanism into and out of operation. Fig. 5 is a front elevational view of the clutch and auxiliary parts. Fig. 6 is a cross-sectional view of the clutch and adjacent gears, and Fig. 7 is a side elevational detail view of the band-brake.

Referring to the drawings, $a$ and $a'$ represent the frames of two bicycles of ordinary construction. To each frame $a$ or $a'$ is secured a vertically-arranged upright $b$, located immediately in the rear of the front wheel $a^2$ of each bicycle. To each frame $a$ or $a'$ is also secured a vertically-arranged upright $b'$, located near the rear or driving wheel $a^3$ of each bicycle. The lower ends of the two uprights $b$ are connected by one or more cross-braces $b^2$, and the lower ends of the uprights $b'$ are similarly connected by one or more braces $b^3$. The uprights $b$ and $b'$ and cross-braces $b^2$ and $b^3$ by preference are formed of bicycle-tubing. The steering-heads $a^4$ of the two bicycles are also connected by cross-braces $b^4$, also preferably formed of bicycle-tubing. Upon the cross-braces $b^2$ and $b^3$ is laid a platform or floor $d$, and upon this floor is supported the motor $e$ for the vehicle. Supported by the uprights $b'$ or adjacent portions of a frame $a$ or $a'$ is a seat $f$. The two seats $f$ thus supported are arranged side by side with a space or aisle between them, so that the operator and passenger may enter from the back of the vehicle and by walking upon the floor through the aisle may reach the required seat. Under one seat $f$ the motor $e$ is preferably located, while under the floor extends the shaft $e'$, driven by the motor $e$, the shaft $e'$ carrying a gear-wheel $e^2$, meshing with a pinion $e^3$, driven by the motor $e$. The pedal-shaft of each bicycle is removed, and in their place a shaft $e^4$, connecting both sprockets $e^5$ together, is substituted. This shaft $e^4$ preferably extends beneath the flooring $d$ and is keyed or otherwise secured to the sprocket-wheels $e^5$. The sprockets $e^5$ are each connected by a chain $e^6$ with a sprocket $e^7$ on the axle of a rear or driving wheel $a^3$ of each bicycle. On the shaft $e^4$ is loosely supported two gears $g$ of high speed and $g'$ of low speed. Each gear $g$ or $g'$ carries a cup $g^2$, into which is adapted to fit one of the cone-shaped surfaces of a friction-clutch $g^3$. This clutch $g^3$ is splined to the shaft $e^4$ between the cup-shaped portions carried by the gears $g$ and $g'$ and may be shifted on the shaft $e^4$, so that a cone-shaped surface will frictionally engage either cup by the following preferred mechanism: Midway of the cone-shaped surfaces projects a flange $g^4$, engaged by two sets of rollers $g^5$, supported in the end of a forked lever-arm $g^6$. This arm $g^6$ is pivoted, as at $g^7$, intermediate of its ends in a bracket or extension $g^8$, projecting from and supported by the floor $d$. This bracket $g^8$ has a sector $g^9$, notched or toothed, as at $g^{10}$, into the recesses of which a pin $g^{11}$ is adapted to slip. A handle $g^{12}$ and rod $g^{13}$ are arranged to control the movement of the pin, so that it may be wholly withdrawn from the notches $g^{10}$ and the lever-arm $g^6$ swung toward the right or left and then again pressed into a notch $g^{10}$ to lock the arm $g^6$ in the required position. A movement of the arm $g^6$ will through its forked end cause the rollers $g^5$ to throw the clutch $g^3$ to the right or left to cause said clutch to engage or interlock with either the high or low speed gear $g$ or $g'$. In the vertical position the arm $g^6$ releases the clutch $g^3$ from both gears $g$ or $g'$, as illustrated in Fig. 6. Each gear $g$ and $g'$ normally travels idly on the sprocket-shaft $e^4$ and conveys its rotation to said shaft only when coupled to the clutch $g'$, as hereinbefore described. The gear $g'$ of larger diameter is geared with a gear $h$ of small diameter, and the gear $g$ of small diameter is geared with a gear $h'$ of larger diameter. The two gears $h$ and $h'$ are keyed to the shaft $e'$, driven, as hereinbefore explained, by the motor $e$. Upon the sprocket-shaft $e^4$ is also secured a friction-disk $k$, around the periphery of which is placed the band $k'$, adapted to be tightened or loosened by the movement of an arm or lever $k^2$. The band-brake thus formed furnishes an effective means for stopping the rotation of the shaft $e^4$ whenever the clutch $g^3$ is thrown out of engagement with both gears $g$ and $g'$. On the shaft $e^4$, adjacent to each sprocket $e^5$, but inside the two frames $a$ and $a'$, is secured a fly-wheel $m$. These two wheels $m$ in rotating serve by their momentum to steady the vehicle and to provide for the equal distribution of power to both ends of the shaft $e^4$.

The steering mechanism for the vehicle is constructed, preferably, as follows: In each head $a^4$ oscillates the shaft $n$, from which the fork supporting the front or steering wheel $a^2$ extends. The two shafts $n$ are each provided with an arm $n'$, secured at one end to the shaft $n$ and connected together at the other end by a link $n^2$. Upon the top cross-brace $b^4$, connecting the heads $a^4$ together, is pivoted a bell-crank lever $n^3$, one arm of which is slotted and engages a pin $n^4$, projecting from the link $n^2$, intermediate of the ends of said link. The other arm of the lever $n^3$ is connected by a link $n^5$ with a handle $n^6$, pivoted at its lower end in a bracket $n^7$, supported upon the flooring. A movement of the handle $n^6$ toward or away from the operator will through the bell-crank lever $n^3$ and link $n^2$ cause the shafts $n'$ to turn to the right or to the left simultaneously.

To start the vehicle before the power is applied to the sprocket-shaft $e^4$, as well as to propel the vehicle by foot if the motor and driving mechanism should be disabled, there is provided a treadle mechanism of the following preferred construction: In a bracket $p$, supported by the floor $d$, adjacent to the front uprights $b$, is pivoted a treadle-lever $p'$, connected by a link $p^2$ with an eccentric or crank pin $p^3$ on a pinion or driving gear-wheel $p^4$. This gear-wheel $p^4$ is keyed to a short shaft $p^5$, arranged in bearings underneath the floor $d$, parallel with and adjacent to the sprocket-shaft $e^4$. This pinion or gear-wheel $p^4$ meshes with a pinion $p^6$, keyed to the shaft $e^4$, and by a reciprocating movement of the treadle-lever $p'$ the gear $p^4$ is rotated, thus turning through the gear $p^6$ the shaft $e^4$.

Having thus described the nature and object of my invention, what I claim as new, and desire to secure by Letters Patent, is—

1. In a motor-vehicle, in combination with two bicycle-frames, two vertical uprights secured to each frame respectively adjacent to each wheel, a flooring supported by said vertical uprights and cross-braces connecting the steering-heads of the respective frames, a motor supported upon the flooring adjacent to the rear or driving wheels of the frames, two sprockets supported respectively by the frames, a shaft connecting said sprockets and supported below the flooring and intermediate gearing connecting the motor with said sprocket-shaft.

2. In a motor-vehicle, two bicycle-frames, uprights and cross-braces connecting the two frames together, a flooring supported by the uprights and cross-braces and extending from the rear of the frames forwardly beyond the sprockets of said frames, two seats each supported by a frame and extending inwardly therefrom toward each other and arranged above the rear end of the flooring, and a motor supported upon the flooring beneath one of said seats, said seats separated by a space or aisle accessible from the rear of the vehicle.

3. In a motor-vehicle, in combination with two bicycle-frames connected with each other, two sprockets and a shaft connecting the two sprockets, of a motor, a driving mechanism for rotating said shaft and two fly-wheels secured to the sprocket-shaft at either end thereof adjacent to a sprocket.

4. In a motor-vehicle, in combination with two bicycle-frames connected with each other, two sprockets and a shaft connecting the two sprockets, of a motor, a driving mechanism for rotating the sprocket-shaft and controlled by the motor, a fly-wheel secured to the sprocket-shaft at either end thereof adjacent to a sprocket, and a treadle mechanism arranged to rotate the sprocket-shaft independently of the driving mechanism of the motor.

5. In a motor-vehicle, in combination with two bicycles connected by cross-braces to form a four-wheeled vehicle, a steering mechanism for the vehicle comprising a lever-arm secured at one end to the shaft supporting each steering-wheel, a link connecting both lever-arms together, a bell-crank lever to one end of which the link is slottedly connected intermediate of the ends of the link, a handle pivoted at its lower end, and a link pivotally connecting the upper end of said handle to the other end of the bell-crank lever.

In testimony whereof I have hereunto set my signature in the presence of two subscribing witnesses.

DANIEL M. PFAUTZ.

Witnesses:
J. WALTER DOUGLASS,
THOMAS M. SMITH.